US010740921B2

(12) United States Patent
Znamenskiy et al.

(10) Patent No.: US 10,740,921 B2
(45) Date of Patent: Aug. 11, 2020

(54) METHOD AND DEVICE FOR ESTIMATING OBSOLUTE SIZE DIMENSIONS OF TEST OBJECT

(71) Applicant: KONINKLIJKE PHILIPS N.V., Eindhoven (NL)

(72) Inventors: Dmitry Nikolayevich Znamenskiy, Eindhoven (NL); Ruud Vlutters, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 134 days.

(21) Appl. No.: 15/776,547

(22) PCT Filed: Nov. 15, 2016

(86) PCT No.: PCT/EP2016/077764
§ 371 (c)(1),
(2) Date: May 16, 2018

(87) PCT Pub. No.: WO2017/085075
PCT Pub. Date: May 26, 2017

(65) Prior Publication Data
US 2018/0374231 A1 Dec. 27, 2018

(30) Foreign Application Priority Data
Nov. 18, 2015 (EP) .................................... 15195073

(51) Int. Cl.
*G06K 9/00* (2006.01)
*G06T 7/60* (2017.01)
*G06T 7/50* (2017.01)

(52) U.S. Cl.
CPC .................. *G06T 7/60* (2013.01); *G06T 7/50* (2017.01); *G06T 2207/20081* (2013.01); *G06T 2207/30201* (2013.01)

(58) Field of Classification Search
CPC ........... G06T 7/60; G06T 7/50; G06T 7/0028; G06T 7/0034; G06T 7/0026;
(Continued)

(56) References Cited

U.S. PATENT DOCUMENTS

| 7,035,467 | B2 * | 4/2006 | Nicponski | G06K 9/00221 382/190 |
| 7,058,209 | B2 * | 6/2006 | Chen | G06K 9/00281 382/117 |

(Continued)

FOREIGN PATENT DOCUMENTS

WO    WO2014057392 A1    4/2014

OTHER PUBLICATIONS

Lehoang, T. et al., "Face Alignment Using Active Shape Model and Support Vector Machine", International Journal of Biometric and Bioinformatics, Feb. 1, 2011 (Feb. 1, 2011), pp. 224-234, XP055277739, Retrieved from the Internet: URL:http://www.cscjournals.org/manuscript/ Journals/IJBB/Volume4/Issue6/IJBB-81.pdf [retrieved on Jun. 2, 2016].

(Continued)

*Primary Examiner* — Amir Alavi
(74) *Attorney, Agent, or Firm* — Michael W. Haas

(57) ABSTRACT

A method for estimating the absolute size dimensions of a test object based on image data of the test object, namely a face or part of a person. The method includes receiving image data of the test object, determining a first model of the test object based on the received image data, and aligning and scaling the first model to a first average model that includes an average of a plurality of first models of reference objects being faces or parts of faces of reference persons. The first models of the reference objects are of a same type as the first model of the test object. The method further includes determining a shape difference between the test (Continued)

object and an average of the reference objects, determining a second model of the test object with an estimated scale based on (i) the determined shape difference, (ii) a statistical operator that is indicative of a statistical correlation between shape and size dimensions of the reference objects, and (iii) a second average model, and determining the size dimensions of the test object based on the second model of the test object.

13 Claims, 5 Drawing Sheets

(58) Field of Classification Search
CPC .......... G06T 7/0024; G06T 3/00; G06T 3/40; G06T 3/60; G06T 2207/20081; G06T 2207/30201; G06K 9/32; G06K 9/00228; G06K 9/00248; G06K 9/00222; G06K 9/00287; G06K 9/00281; G06F 17/148
See application file for complete search history.

(56) References Cited

U.S. PATENT DOCUMENTS

| | | | |
|---|---|---|---|
| 7,672,973 B2 | 3/2010 | Lordo | |
| 7,827,038 B2 | 11/2010 | Richard | |
| 8,009,880 B2* | 8/2011 | Zhang | G06K 9/00268 345/582 |
| 8,331,616 B2* | 12/2012 | Sabe | G06K 9/00248 382/103 |
| 8,559,707 B2* | 10/2013 | Wu | G06K 9/3233 382/165 |
| 9,317,785 B1* | 4/2016 | Moon | G06K 9/00234 |
| 9,747,493 B2* | 8/2017 | Rodriguez | G06K 9/00288 |
| 10,445,938 B1* | 10/2019 | Poliakov | G06T 7/246 |
| 2010/0202699 A1 | 8/2010 | Matsuzaka | |
| 2014/0185924 A1* | 7/2014 | Cao | G06K 9/00281 382/159 |
| 2018/0276489 A1* | 9/2018 | Xu | G06K 9/00899 |
| 2018/0374231 A1* | 12/2018 | Znamenskiy | G06T 7/60 |

OTHER PUBLICATIONS

Xiong Xuehan et al: "Supervised Descent Method and Its Applications to Face Alignment", IEEE Computer Society Conference on Computer Vision and Pattern Recognition. Proceedings, IEEE Computer Society, US, Jun. 23, 2013 (Jun. 23, 2013), pp. 532-539, XP032492802.

Xudong, C. et al., "Face Alignment by Explicit Shape Regression", International Journal of Computer Vision, vol. 107, Issue 2, pp. 177-190, Dec. 2013.

Rivera, S. et al., "Learning Deformable Shape Manifolds", Patter Recognition, 45, 2012, pp. 1792-1801.

Allen, N. et al., "Statistical Appearance Modelling of Facial Images: Investigating Flexibility, Specificity and Compactness", Proceedings of the Seventeenth Annual Symposium of the Pattern Recognition Association of South Africa, 2006.

L'Aszlo, A. J. et al., "Dense 3D Face Alignment from 2D Videos in Real-Time", 2015 11th IEEE International Conference and Workshops on Automatic Face and Gesture Recognition (FG), May 4-8, 2015.

Kabsch, W. et al., "A Solution for the Best Rotation to Relate Two Sets of Vectors", Short Communications, Acta Cryst. (1976). A32, 922-923.

Kabsch, W. et al., "A Discussion of the Solution for the Best Rotation to Relate Two Sets of Vectors", Short Communications, Acta Cryst. (1978). A34, 827-828.

* cited by examiner

METHOD AND DEVICE FOR ESTIMATING OBSOLUTE SIZE DIMENSIONS OF TEST OBJECT

CROSS-REFERENCE TO RELATED APPLICATIONS

This patent application claims the priority benefit under 35 U.S.C. § 371 of international patent application no. PCT/EP2016/077764, filed Nov. 15, 2016, which claims the benefit of European Patent Application No. 15195073.0, filed on Nov. 18, 2015, the contents of which are herein incorporated by reference.

FIELD OF THE INVENTION

The present invention relates to method for estimating absolute size dimensions of a test object, in particular a human face or a part of a human face, based on image data of the test object. In a further aspect, the present invention relates to a corresponding device which is configured to carry out said method. In a still further aspect, the present invention relates to a computer program comprising program code means for causing a computer to carry said method.

The field of application of the present invention is an estimation of absolute facial dimensions based on unscaled image data for the purpose of fitting and/or selecting patient interfaces, such as masks for positive airway pressure therapy.

BACKGROUND OF THE INVENTION

Patient interfaces, such as masks in pressure support systems, are used for delivering gas to a user (herein also referred to as "person" or "patient"). Such gases like air, cleaned air, oxygen, or any modification thereof are submitted to the user via the patient interface in a pressurized or unpressurized way.

For several chronic disorders and diseases, the usage of such a patient interface is necessary or at least advisable.

One non-limiting example of such a disease is obstructive sleep apnea or obstructive sleep apnea syndrome (OSA). OSA is usually caused by an obstruction of the upper airway. It is characterized by repetitive pauses in breathing during sleep and is usually associated with a reduction in blood oxygen saturation. These pauses in breathing, called apneas, typically last 20 to 40 seconds. The obstruction of the upper airway is usually caused by reduced muscle tonus of the body that occurs during sleep. The human airway is composed of walls of soft tissue which can collapse and thereby obstruct breathing during sleep. Tongue tissue moves towards the back of the throat during sleep and thereby blocks the air passages. OSA is therefore commonly accompanied with snoring. Different invasive and non-invasive treatments for OSA are known. One of the most powerful non-invasive treatments in the usage of Continuous Positive Airway Pressure (CPAP) or Bi-Positive Airway Pressure (BiPAP) in which a patient interface, e.g. a face mask, is attached to a hose and a machine that blows pressurized gas, preferably air, into the patient interface and through the airway of the patient in order to keep it open. Positive air pressure is thus provided to a patient through a hose connected to a patient interface or respiratory interface, such as a face mask, that is worn by the patient. The afore-mentioned long-term use of the patient interface is the result, since the wearing of the patient interface usually takes place during the sleeping time of the patient.

Examples for patient interfaces are:
nasal masks, which fit over the nose and deliver gas through the nasal passages,
oral masks, which fit over the mouth and deliver gas through the mouth,
full-face masks, which fit over both, the nose and the mouth, and deliver gas to both,
total-face masks, which cover the full face or substantially the full face, surrounding the nose, mouth as well as the eyes and delivering gas to the mouth and nose, and
nasal pillows (also referred to as alternative masks), which are regarded as masks as well within the scope of the present invention and which consist of small nasal inserts that deliver the gas directly to the nasal passages.

In order to guarantee a reliable operation of the device, the patient interface (mask) needs to closely fit on the patient's face to provide an air-tight seal at the mask-to-face interface. Usually, the patient interface is worn using a head gear with straps that go around the back of the patient's head. The patient interface or mask in practice usually comprises a soft cushion that is used as mask-to-patient interface, i.e. that contacts the face of the patient when the mask is worn, as well as it usually comprises a so-called mask shell building a rigid or semi-rigid holding structure for holding the cushion in place and for supplying mechanical stability to the patient interface (mask).

The cushion usually comprises one or more pads made of gel or silicone or any other soft material in order to increase the patient comfort and guarantee a soft feeling on the patient's face. The latter-mentioned mask shell usually also comprises a hose interface that is adapted for connecting the air supplying hose to the mask. Depending on the type of the mask, it may also comprise a mechanism with an additional cushion support on the forehead to balance the forces put by the mask around the airway entry features of the human face.

It is evident that a close and correct fit of the patient interface is of utmost importance for a reliable operation of the device. An incorrect fit of the patient interface may not only lead to unwanted air leaks at the mask-to-face interface, but may also cause excessive pressure points on the skin of the patient's face that again may cause unpleasant and painful red marks in the patient's face. The patient interface, therefore, needs to be accurately fitted to the individual face contours of the patient. Various types of patient interfaces exist, i.e. not only different sizes and shapes, but also different types of patient interfaces. As the anatomical features of faces differ from patient to patient, the best fitting patient interface also differs from patient to patient. In other words, an individualized fitting or selection of a patient interface is required, and it is evident that a good fitting or selection of a patient interface relies on a correct measurement or estimation of the absolute facial dimensions of the patient.

A mask fitting system that makes use of a simplified fitting technique is known from US 2006/0235877 A1. The mask fitting system and method described therein determine the dimensions of the patient's head with a template or a ruler. Alternatively, one or more images of the patients are captured and then the dimensions of the patient's head are manually typed into the system using a questionnaire that has to be filled out by the patient. In any case, the absolute facial dimensions need to be either manually measured or inputted into the system by the patient filling out the questionnaire. This is, of course, bothersome and time-consuming for the user. Apart from that, a manual measurement of the facial dimensions requires an educated person to conduct the measurements, and it is error prone to subjective interpretation of physiological facial landmarks.

In many practical appliances the facial dimensions cannot be measured manually (since there is no time) or no absolute dimensions of the user's face are known in advance, so that the device and method proposed in US 2006/0235877 A1 is not only disadvantageous, but can also not be applied in many practical situations.

Alternatively, it is also possible to use a calibrated optical scanner in order to receive the absolute facial dimensions. However, the use of such calibrated optical scanners cannot be perceived as a commodity yet. Apart from that, such calibrated optical scanners are quite expensive in production and, at least so far, they do not seem to be suitable as everyday devices in a private or semi-professional surrounding.

It would therefore be neat if one could reconstruct or estimate the facial dimensions from a "regular" photo or video. Modern computer vision technologies allow accurate reconstruction of the facial shape using a single (mono) video camera (see e.g. Jeni, L. A. et al.: Dense 3D Face Alignment from 2D Videos in Real-Time, the Robotics Institute, Carnegie Mellon University, Pittsburgh, Pa., USA, zface.org). By using such a technique the input to an application for advising, selecting and/or fitting a patient interface could be then a single photograph (selfie) or a short video taken with a regular smartphone (mono) camera. However, it is important to note that the afore-mentioned method only allows an accurate reconstruction of the shape of the face of a person but not a reconstruction of the absolute dimensions of the face of the person. In other words, a direct measurement of the reconstructed facial model is not possible due to the scale ambiguity, as the absolute dimensions of the reconstructed object cannot be recovered using a single (mono) camera setup. The true scale of the facial model may thus not be determined in an automated way when using the afore-mentioned method.

Thus, there is still room for improvement.

One of the most popular local texture models for face alignment is a model known as Active Shape Model (ASM). This model applies in many fields, including the field of locating facial features in an image, and the field of face synthesis. Le Hoang Thai; Vo Nhat Truong et al: "Face Alignment Using Active Shape Model And Support Vector Machine", International Journal of Biometric and Bioinformatics, 1 Feb. 2011, pages 224-234, XP055277739, relates to improving the ASM so as to have increased performance of the ASM for face alignment applications of the model. The improvements include using a Support Vector Machine (SVM) to classify landmarks on a detected face in an image, and automatically adjusting a 2-D profile in a multi-level model based on the size of the input image. In the process, an alignment (scaling, rotation and translation) of a model on the face in the image is performed.

Xiong Xuehan et al: "Supervised Descent Method and Its Applications to Face Alignment", IEEE Computer Society Conference on Computer Vision and Pattern Recognition. Proceedings, IEEE Computer Society, US, 23 Jun. 2013, pages 532-539, XP032492802, relates to a Supervised Descent Method (SDM) for minimizing a Non-linear Least Squares (NLS) function. During training, the SDM learns a sequence of descent directions that minimizes the mean of NLS functions sampled at different points. In testing, SDM minimizes the NLS objective using the learned descent direction without computing the Jacobian nor the Hessian. In particular, it is shown how SDM achieves state-of-the-art performance in the field of facial feature detection.

SUMMARY OF THE INVENTION

It is an object of the present invention to provide an improved method and device for estimating absolute size dimensions of a test object, in particular a human face or a part of a human face, based on image data of the test object. It is particularly an object to provide a method and device that allow a reconstruction of a facial model with an estimated scale based on unscaled image data used as input.

In a first aspect of the present invention a method for estimating absolute size dimensions of a test object based on image data of the test object is presented, the test object being a face or a part of a face of a test person, which method comprises the steps of:

receiving image data of the test object;

determining a first model of the test object based on the received image data, wherein the first model has an unknown scale;

aligning and scaling the first model of the test object to a first average model, wherein the first average model includes an average of a plurality of first models of reference objects being faces or parts of faces of reference persons, wherein said first models of the reference objects are of a same type as the first model of the test object and have an unknown scale;

determining a shape difference between the test object and an average of the reference objects by determining a difference between the aligned and scaled first model of the test object and the first average model;

determining a second model of the test object with an estimated scale based on (i) the determined shape difference, (ii) a statistical operator that is indicative of a statistical correlation between shape and size dimensions of the reference objects, and (iii) a second average model, wherein the second average model includes an average of a plurality of second models of the reference objects, wherein said second models of the reference objects are of a same type as the second model of the test object and have a known scale; and determining the size dimensions of the test object based on the second model of the test object.

In a further aspect of the present invention a corresponding device for estimating absolute size dimensions of a test object based on image data of the test object is presented, the test object being a face or a part of a face of a test person, the device comprising:

a receiving unit for receiving image data of the test object; and a processing unit which is configured to:
determine a first model of the test object based on the received image data, wherein the first model has an unknown scale;
align and scale the first model of the test object to a first average model, wherein the first average model includes an average of a plurality of first models of reference objects being faces or parts of faces of reference persons, wherein said first models of the reference objects are of a same type as the first model of the test object and have an unknown scale;
determine a shape difference between the test object and an average of the reference objects by determining a difference between the aligned and scaled first model of the test object and the first average model;
determine a second model of the test object with an estimated scale based on (i) the determined shape difference, (ii) a statistical operator that is indicative of a statistical correlation between shape and size dimensions of the reference objects, and (ii) a second average model, wherein the second average model includes an average of a plurality of second models of the reference objects, wherein said second models of the reference objects are of a same type as the second model of the test object and have a known scale; and determine the size dimensions of the test object based on the second model of the test object.

In a still further aspect of the present invention a computer program is presented which comprises program code means for causing a computer to carry out the steps of the above-mentioned method when said computer program is carried out on a computer.

Preferred embodiments of the invention are defined in the dependent claims. It shall be understood that the claimed device and computer program have similar and/or identical preferred embodiments as the claimed method and as defined in the dependent claims.

The proposed method is based on the found statistical correlation between the shape and the real size of human faces. The presented method so to say exploits the statistical difference in scale-free shape between large and small faces.

Extensive experiments and statistical evaluations of the applicant have shown that small and large faces generally have different appearances regarding their shapes. In other words, a picture of a naturally large face (a face that is in true scale measured to be comparatively large) may be differentiated based on the shape of the shown face from a picture showing a naturally small face (a face that is in true scale measured to be comparatively small). The characteristic shapes corresponding to naturally small and large faces remain different even if the picture of such a face is scaled by magnifying or demagnifying the picture to a standard size with unknown scale.

Statistical evaluations of the applicant have shown, for example, that comparatively larger faces have noses with more curved down nose tips compared to more curved up nose tips in comparatively smaller faces. The space between the nose and the upper lip is usually also more curved down in larger faces than in comparatively smaller faces. The chin usually appears to be more angled in larger faces than in smaller faces. Chins of smaller faces have regularly a smoother contour and are usually smaller compared to the mouth size (relative size). It shall be noted that these are only some examples of such statistically proven differences between the shapes of smaller and larger faces.

The herein presented method starts with receiving image data of the test object, e.g. a picture or video of a part of a face or of a complete face of a test person. If such an image or video is taken by a "regular" (mono) camera no information exist per se regarding the dimensions of the face of the test person shown in the image or video. The method therefore uses in a next step a facial model which is herein denoted as "first model". It shall be noted that the term "first model" is so to say merely a name for a model of a certain kind, but does not imply any chronological or hierarchical order nor does it imply any specific type of model. The term "first model" is mainly used to distinguish it from another type of model that is herein denoted as "second model" and explained in detail further below.

The first model of the test object is determined based on the received image data. Since the image data, as explained before, are usually provided as pixel data in pixel coordinates with an unknown scale, the first model that is fitted to the image data consequently also has an unknown scale.

In a further step said first model of the test object is aligned and scaled to a so-called "first average model" which includes an average of a plurality of first models of reference objects. The reference objects are of the same kind as the test object. In the above-mentioned main field of application of the present invention the reference objects e.g. represent parts of faces or faces of reference persons. The first models of the reference objects are of the same type as the first model of the test object, meaning that these models have the same structure and general constraints. If e.g. the first model of the test object is a model comprising 2D facial landmarks, the models of the reference objects are models of the same types using the same amount and the same type of identified facial landmarks.

The first average model may be determined beforehand based on image data of the reference objects that are e.g. pre-stored in a database. The first average model may be also pre-stored in the database. The first average model may be generated during a learning phase. In case the first models of the reference objects are landmark models including a collection of distinctive object points, the first average model may be a model that is determined by determining for each distinctive object point a (linear) average of the respective object points in all reference objects. Of course, the first average model may be re-calculated each time image data of a new reference object are added to the database, such that this process is repeated several times. Instead of a linear average a weighted average may be used.

The above-mentioned alignment of the first model of the test object to the first average model preferably comprises a rigid alignment. The scaling of the first model of the test object to the first average model is preferably based on a model fitting which includes a minimization of a root mean square of a difference between the first model of the test object and the first average model. However, it shall be noted that after this scaling operation the first model of the test object has the same scale as the first average model. The scale of the first average model can be considered as known. Thus, after the scaling operation the first model of the test object gets a known, yet not correct scale of the average of the first models.

In the next step the difference between the aligned and scaled first model of the test object and the first average model is calculated. Since both the first model of the test object and the first average model have the same (unknown) scale, this difference does not include "size differences" between the test object and the average of the reference objects, but mainly or solely includes a shape difference between the test object and the average of the reference objects.

Then, a second model of the test object may be calculated, which second model has an estimated scale. The scale of the second model of the test object is not known beforehand but may be determined/estimated. This second model of the test object is so to say the target output model of the test object that needs to be determined in order to being able to measure the size of the test object.

The second model of the test object is determined based on (i) the determined shape difference, (ii) a statistical operator that is indicative of a statistical correlation between shape and size of the reference objects, and (iii) a second average model.

The second average model includes, similar as the above-mentioned first average model, an average of a plurality of second models of the reference objects, wherein the second models of the reference objects are of the same type as the second model of the test object. However, in contrast to the first models of the reference objects, these second models of the reference objects have a known scale. In other words, the dimensions of the test objects represented in the second models are known. The second average model could thus also be denoted as real size average model.

The second average model and the statistical operator may be, same or similar as the above-mentioned first average model, determined beforehand (in advance to evaluating the image data of the test object by means of the presented method). The second average model and the statistical operator may be found during a statistical "training phase" and pre-stored in a database.

According to an embodiment of the present invention, the statistical operator may be determined in the following way:

receiving for each of the reference objects a first model which is of a same type as the first model of the test object;

receiving for each of the reference objects a second model which is of a same type as the second model of the test object and has a known scale;

aligning and scaling the first model of each reference object to the first average model;

aligning the second model of each reference object to the second average model;

determining for each reference object an unscaled shape difference between each of the reference objects and the average of the reference objects by determining a difference between the aligned and scaled first model of each reference object and the first average model;

determining for each reference object a scaled shape difference between each of the reference objects and the average of the reference objects by determining a difference between the aligned second model of each reference object and the second average model; and determining a transformation from the determined unscaled shape differences to the determined scaled shape differences for all of the reference objects in a common mathematical operator which represents said statistical operator.

Hence, similar operations are carried out for each of the reference objects as explained above for the test object. First, a first model, which is of a same type as the first model of the test object, is received for each of the reference objects. These first models may be e.g. derived from images or videos of each of the reference objects, respectively. Second models, which are of the same type as the second model of the test object and have a known scale, are also received for each of the reference objects. The first models of reference objects are then one after the other aligned and scaled to the first average model. As this is repeated several times, each time a new first model of a new reference object is aligned and scaled to the first average model, the first average model may be updated based on said new first model of the new reference object. Since the second models of the reference objects have known scales and are so to say provided in true scale, they "only" have to be aligned with the second average model, but do not have to be scaled to it.

In the next steps differences between the aligned and scaled first model of each reference object and the first average model are calculated (for each reference object separately). Similarly, differences are calculated between the aligned second model of each reference object and the second average model (for each reference object separately). Due to the alignment and scaling of the first models and the alignment of the second models performed beforehand, these two types of differences again only include information regarding shape differences (not size differences). However, the difference between the aligned and scaled first models of the reference objects and the first average model result in unscaled shape differences (having unknown scales), whereas the differences between the second models of the reference objects and the second average model result in scaled shape differences (having known scales).

The statistical operator is then determined by determining a transformation from the determined unscaled shape differences to the determined scaled shape differences for all of the reference objects in a common mathematical operator. This common mathematical operator, which can be represented in matrix form, is the so called statistical operator.

According to a preferred embodiment, the statistical operator is determined based on a least mean square method which minimizes a root mean square residual error between the scaled shape differences of all reference objects and a result of an application of the statistical operator applied to the determined unscaled shape differences of all reference objects.

It is particularly preferred to use a linear approach for the dependency between the unscaled shape differences, the statistical operator and the scaled shape differences. This could look as follows:

$$V = AvgV_{GT} + P*(L_{GTS} - AvgL_{GT}); \quad (1)$$

wherein V represents the second models of the reference objects, $AvgV_{GT}$ represents the second average model, P represents the statistical operator, $L_{GTS}$ represents the aligned and scaled first models of the reference objects, and $AvgL_{GT}$ represents the first average. This also means that V $AvgV_{GT}$ represents the above-mentioned scaled shape differences (differences between the aligned second models of the reference objects and the second average model); and $L_{GTS} - AvgL_{GT}$ represents the above-mentioned unscaled shape differences (differences between the aligned and scaled first models of the reference objects and the first average model).

The statistical operator P may thus be found by solving the above-mentioned linear system. After the statistical operator P is found, the second model of the test object (target model of the test object with estimated scale) may be found by the same type of linear equation in re-arranged form:

$$V = AvgV_{GT} + P*(L_{GTS} - AvgL_{GT}); \quad (1')$$

wherein V represents the second model of the test object, $AvgV_{GT}$ represents the second average model, P represents the statistical operator, $L_{GTS}$ represents the aligned and scaled first model of the test object, and $AvgL_{GT}$ represents the first average. It shall be noted that, in contrast to the usage of equation 1 for determining P as explained above, V this time represents in equation 1' the second model of the test object (not of the reference objects); and $L_{GTS}$ represents the aligned and scaled first model of the test object (not of the reference objects).

The method can be refined by selecting beforehand reference objects that are similar to the test object. In the most preferable field of application, where the test object represents a face of a test person and the reference objects represent faces of reference persons, experiments of the applicant have shown that the statistical correlation between the shape characteristics and the real size of the human face is particularly true for faces of persons of the same ethnicity and/or the same gender. The age of the person may also be a relevant information factor that could be used to improve the statistical correlation.

According to an embodiment of the present invention, the method comprises the step of selecting the plurality of first models of the reference objects from a collection of first models of objects of a same type as the test object, wherein the selected plurality of first models of the reference objects is a subset of said collection, and wherein the plurality of first models of the reference objects are selected based on:

(i) a comparison of the first model of the test object with the first models contained in said collection; and/or (ii) answers to a predefined questionnaire.

In other words, subgroups of the collection of reference objects may be determined beforehand in order to identify the reference objects based on which the first average model, the second average model and the statistical operator are calculated. These particularly relevant reference objects may be identified by means of an automatic analysis of the first model of the test object, which includes a comparison of said first model of the test object with the first models of all objects contained in said collection, and/or based on answers to a predefined questionnaire that includes questions regarding the above-mentioned factors like ethnicity, gender, age and/or other personal information.

According to a further embodiment, scaling the first model of the test object to the first average model is based on a model fitting which includes a minimization of a root mean square of a difference between the first model of the test object and the first average model. This scaling and aligning of the first model of the test object to the first average model may be done e.g. using the weighted N-point alignment algorithm which is, for example, described in Kabsch, W.: A solution for the best rotation to relate two sets of vectors, Acta Cryst A 1976; 32; 9223 as well as in Kabsch W.: A discussion of the solution for the best rotation to relate two vectors, Acta Cryst A 1978; 34; 8278.

Preferably, the first model of the test object, the models of the reference objects, the second model of the test object, and the second models of the reference objects include a collection of 2D landmarks, a collection of 3D landmarks, or a mesh of 2D landmarks or a mesh of 3D landmarks. Such models may e.g. be found in Xiong, X. et al.: Supervised descent method and its applications to face alignment, the Robotics Institute, Carnegie Mellon University, Pittsburgh, Pa., 15213 or in Jeni, L. A. et al.: Dense 3D face alignment from 2D videos in real time, Robotics Institute, Carnegie Mellon University, Pittsburgh, Pa., USA.

Even though it is generally possible that the second models are of the same type as the first models, it is preferred that the second models are denser models than the first models comprising more landmarks or model vertices. It shall be also noted that the landmarks/vertices of the first models do not have to be the same as the landmarks/vertices of the second models.

According to a further embodiment, the first model of the test object is determined by fitting a predetermined model template to the received image data. The first models of the reference objects, the second model of the test object and the second models of the reference objects may be determined in the same way, i.e. by fitting a predetermined parametric model.

The first and second models of the reference objects may be derived from 3D image data received from a 3D scanner, a MRI device, a CT device, an ultrasound device, or a x-ray device. The second models of the reference objects are, in contrast to the second model of the test object, preferably not estimated in the above-mentioned way using the knowledge about the statistical correlation between shape and size differences, but are preferably directly derived from image data with known scales and dimensions.

BRIEF DESCRIPTION OF THE DRAWINGS

These and other aspects of the invention will be apparent from and elucidated with reference to the embodiments described hereinafter. In the following drawings

DETAILED DESCRIPTION OF EXEMPLARY EMBODIMENTS

The embodiments explained in the following are to be merely understood as exemplary embodiments of the herein presented method and device. These embodiments are described for the purpose for illustration based on what is currently considered to be most practical and preferred. However, on the contrary, it is intended to cover modifications and equivalent arrangements that are within the spirit and scope of the appended claims.

Figure 1:
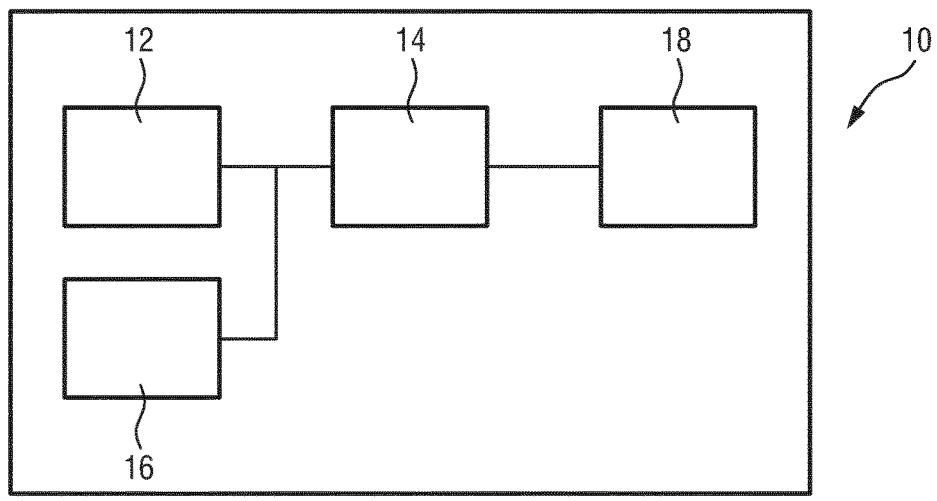
FIG. 1 shows a block diagram which schematically illustrates a device according to an embodiment of the present invention.

FIG. 1 schematically illustrates an exemplary embodiment of a device according to the present invention. The device is therein in its entirety denoted by reference numeral 10.

The device 10 comprises a receiving unit 12 and a processing unit 14. The device 10 may furthermore comprise a memory unit 16 and an output unit 18. Still further, the device may comprise an input unit (not shown), such as a keyboard, a mouse, a touchscreen and/or several control buttons.

The receiving unit 12 is configured to receive image data. These image data may comprise 2D or 3D image data. The image data may exemplarily include 2D images/photographs, 3D images, 2D or 3D scans, and/or 2D or 3D videos (image sequences). Depending on the type of implementation of the device 10, the receiving unit 12 may be implemented as a data interface, either a hard-wired data interface (e.g. a USB interface or a LAN interface) or a wireless data interface (e.g. a Bluetooth® interface or WLAN interface). In another type of implementation of the device 10 the receiving unit 12 may also include a device which is able and configured to generate the image data. Such a device may, for example, include a 2D photo camera, a 3D photo camera, a 2D or 3D video camera, a 3D scanner, a MRI device, a CT device, an ultrasound device, or a x-ray device.

The memory unit 16 may comprise any type of data storage suitable for permanently or temporarily retaining digital data. The memory unit 16 may include any type of volatile or non-volatile memory and may also refer to an external database (external to the device 10) which is accessible over a network, the Internet or cloud computing.

The output unit 18 may comprise any type of device that is able and configured to output information in audible, visible and/or tactile form. The output unit 18 may, for example, comprise a display monitor and/or a loudspeaker.

The processing unit 14 may be generally imagined as the "brain" of the device 10. The processing unit 14 may include one or more of a digital processor, an analog processor, a digital circuit designed to process information, a state machine and/or other mechanisms for electronically processing information. The processing unit 14 may be realized as a CPU or other kind of computer hardware with software stored thereon which is configured to carry out logical processes for controlling and/or steering the device 10. The processing unit 14 may be implemented e.g. as a chip or as a stand-alone device that interfaces with the receiving unit 12, the memory unit 16, and/or the output unit 18 in case those are realized as peripheral devices.

The processing unit 14 is configured to carry out the method according to the present invention. An exemplary embodiment of this method is schematically illustrated in a flow chart in FIG. 2.

Figure 2:
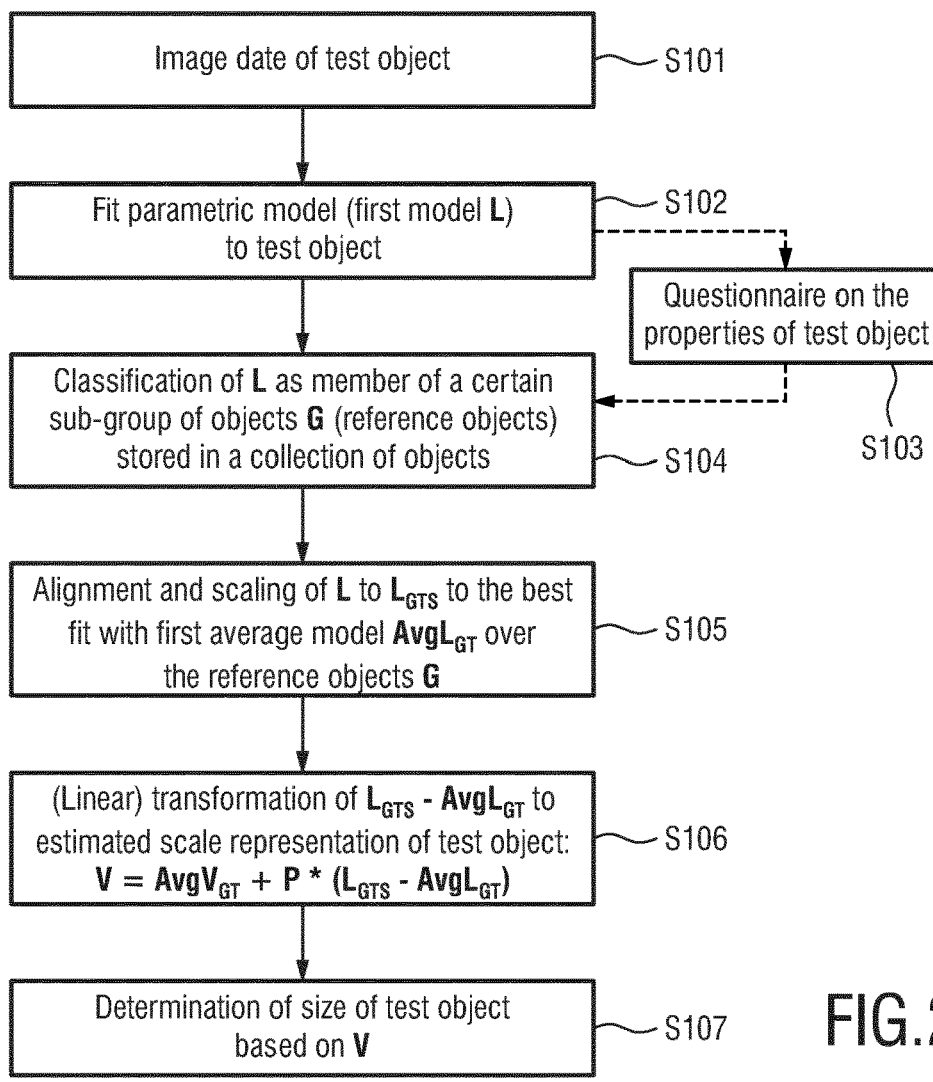
FIG. 2 shows a flow chart which schematically illustrates a method according to an embodiment of the present invention.

The embodiment according to the present invention illustrated in FIG. 2 includes method steps S101-S107, wherein it shall be understood that not all method steps S101-S107 are mandatory method steps. For example, method steps S103 and S104 are method steps that are considered to be optional.

The herein presented method is generally based on the statistically proven hypothesis that there is a statistical correlation between the shape and the real size of human faces which leads to the fact that there appears to be differences in scale-free characteristical facial shapes between larger and smaller faces. Extensive experiments and statistical evaluations of the applicant have shown that small and large faces generally have different appearances regarding their shapes. These characteristical shape differences are retained even if pictures of in reality large faces are scaled to the same size than pictures of in reality smaller faces.

Figure 3B:
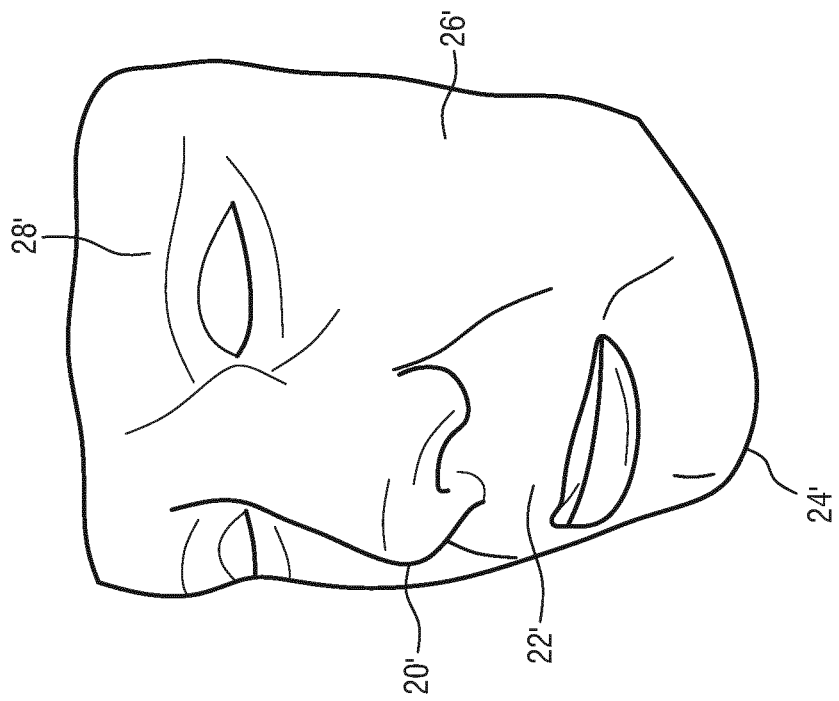
FIGS. 3A and 3B schematically illustrate two exemplary faces that are rescaled to the same size, wherein the face illustrated in FIG. 3A is in reality larger than the face illustrated in FIG. 3B.
Figure 3A:
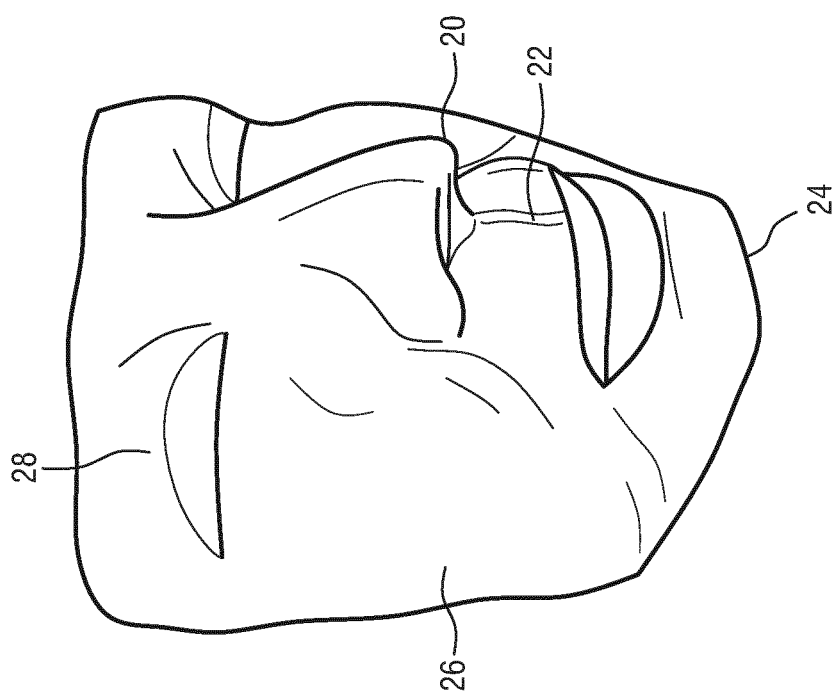

FIGS. 3A and 3B schematically illustrate two exemplary faces which are re-scaled to one and the same dimension. The face illustrated in FIG. 3A is a face that is in reality larger (has a larger size) than the face shown in FIG. 3B.

The following typical shape differences between naturally larger and naturally smaller faces may be observed from a comparison of FIGS. 3A and 3B: The nose tips 20 of larger faces are usually more curved down compared to more curved up nose tips 20' in smaller faces. The space 22 between the nose and the upper lip is usually also more curved down and more corrugated than in comparatively smaller faces (see region around reference numeral 22'). The chins 24 of larger faces usually appear to be more angled than the chins 24' in comparatively smaller faces. The chins 24' of smaller faces have regularly a smoother contour and are usually relatively smaller compared to the mouth size. Further characteristical differences between larger and smaller faces may be usually observed in the area of the cheeks 26, 26' as well as in the regions around the eyes 28, 28'.

It shall be noted that the afore-mentioned differences are only those differences which are easy to observe at first sight. However, it should be clear that modern computer vision technologies allow the determination of such and other differences in a more accurate and statistically relevant manner.

In the following the embodiment of the method schematically illustrated in FIG. 2 shall be explained in detail.

The method begins with step S101. In this step image data of a test object, meaning an object under test, are acquired. This may e.g. include an acquisition of a video or an image of a test person.

The next step S102 includes a fitting of a parametric model to the test object. This parametric model is herein generally denoted as "first model" and abbreviated by L. The first model L is preferably a landmark/vertex model, either 2D or 3D, which comprises approximately 40-200 points which represent the contours of the test object.

Figure 4:
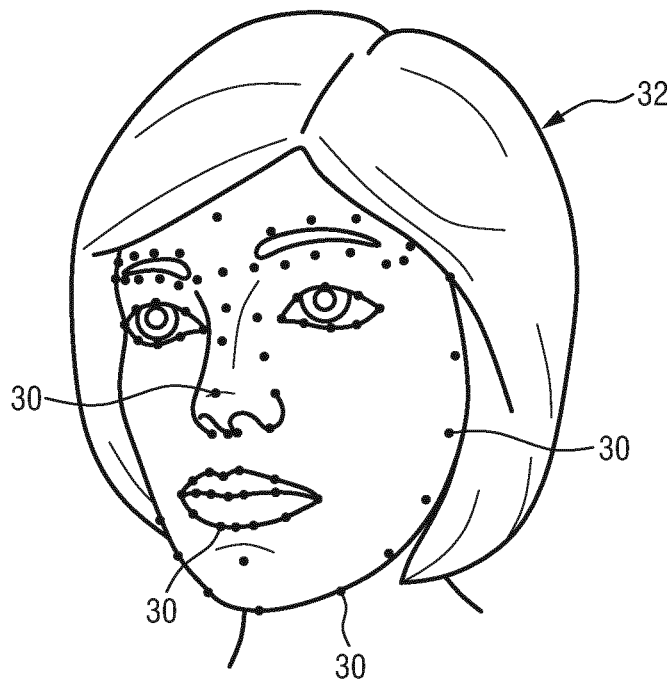
FIG. 4 shows an exemplary embodiment of a facial model that is herein denoted as "first model"

FIG. 4 shows an example of such a first model L (see reference numeral 30) applied to a face 32 of a test person. General examples of such a first model L can be (i) a collection of 2D landmarks as schematically illustrated in FIG. 4 or proposed by Xiong, X. et al.: Supervised descent method and its applications to face alignment, the Robotics Institute, Carnegie Mellon University, Pittsburgh, Pa., 15213, (ii) a dense mesh of 3D landmarks as proposed by Jeni, L. A.: Dense 3D face alignment from 2D videos in real time, Robotics Institute, Carnegie Mellon University, Pittsburgh, Pa., USA.

Optionally, the first model L of the test object determined in step S102 may then be classified as a member of a certain sub-group of objects in steps S103 and S104. Said classification may be made depending on criteria like gender, ethnicity and/or age of the test object. These criteria may be determined based on answers given to a predetermined questionnaire (see step S103). Alternatively or additionally, the classification can be done by means of an automated analysis which compares the first model of the test object with other first models of the same type of objects. Such first models of objects of the same type as the text object may be contained in a collection of first models that is, for example, stored in the memory unit 16. It is clear that such a collection of first models, e.g. a collection of facial landmark/vertex models L of other persons, has to be created and pre-stored in the memory unit 16 in advance. It is also clear that this collection has to contain a large enough number of such first models L of other persons in order to be able to perform statistically relevant evaluations as needed for the method according to the present invention.

It shall be also noted that all these first models L should be of the same type as the first model L of the test person. Since the first models L are usually determined based on pictures or videos with unknown scale, the first models L themselves do not have a known scale, but are usually represented in unscaled pixel coordinates.

The result of steps S103 and S104 is the identification of relevant reference objects, or more particular the first models L of the reference objects G, as a subset of said collection of first models of objects that are stored in the memory unit 16. It shall be noted that said subset of first models L of reference objects G should also contain a sufficient number of first models for a statistically relevant evaluation.

The first model L of the test object is then rigidly aligned and scaled for the best root mean square fit with an average of the plurality of first models of the identified reference objects. Said average is herein denoted as first average model $AvgL_{GT}$. Said rigid alignment and scaling of the first model L of the test object to the first average model $AvgL_{GT}$ results in aligned and scaled first model $L_{GTS}$ of the test object (see step S105). The alignment and scaling can be done using the weighted n-point alignment algorithm that is described, for example, in Kabsch, W.: A solution for the best rotation to relate two sets of vectors, Acta Cryst A 1976;

32; 9223 as well as in Kabsch, W.: A discussion of the solution for the best rotation to relate two vectors, Acta Cryst A 1978; 34; 8278.

The following step S106 includes two sub-steps. The first sub-step is the determination of a shape difference between the test object and the average of the reference objects by determining a difference between the aligned and scaled first model $L_{GTS}$ of the test object and the first average model $AvgL_{GT}$ over the reference objects G. The reason why this difference is denoted as "shape difference" is that size differences do not appear any more, since the first model of the test object $L_{GTS}$ has been already aligned and scaled to the first average model $AvgL_{GT}$ of the reference objects G. The scale of the first average model $AvgL_{GT}$ can be considered as known, since it is possible to calculate this scale during the training phase. Thus, after the scaling operation the first model of the test object gets a known yet not a correct scale of the average of the first model.

In the next sub-step of step S106 the calculated shape difference $L_{GTS}$ $AvgL_{GT}$ is multiplied with a conversion matrix P and the result is added to a second average model $AvgV_{GT}$ to compute a second model V of the test object with an estimated scale based on the following formula:

$$V = AvgV_{GT} + P^*(L_{GTS} - AvgL_{GT});\qquad(1')$$

The conversion matrix P is herein generally denoted as statistical operator. This statistical operator is indicative of a statistical correlation between the shape and size of the reference objects. The second average model $AvgV_{GT}$ includes an average of a plurality of second models of the reference objects G, wherein said second models of the reference objects are of the same type as the second model V of the test object. The main difference between said second models and said first models is that the second models, in particular the second models of the reference objects, have a known scale. In other words, the real dimensions of the second models of the reference objects are known. The scale of the first average model $AvgL_{GT}$ can be the same as, bigger than, or smaller than the scale of the second average model $AvgV_{GT}$, and/or expressed in different units (e.g. pixel coordinates for $AvgL_{GT}$ rather than mm for $AvgV_{GT}$)

Figure 5:
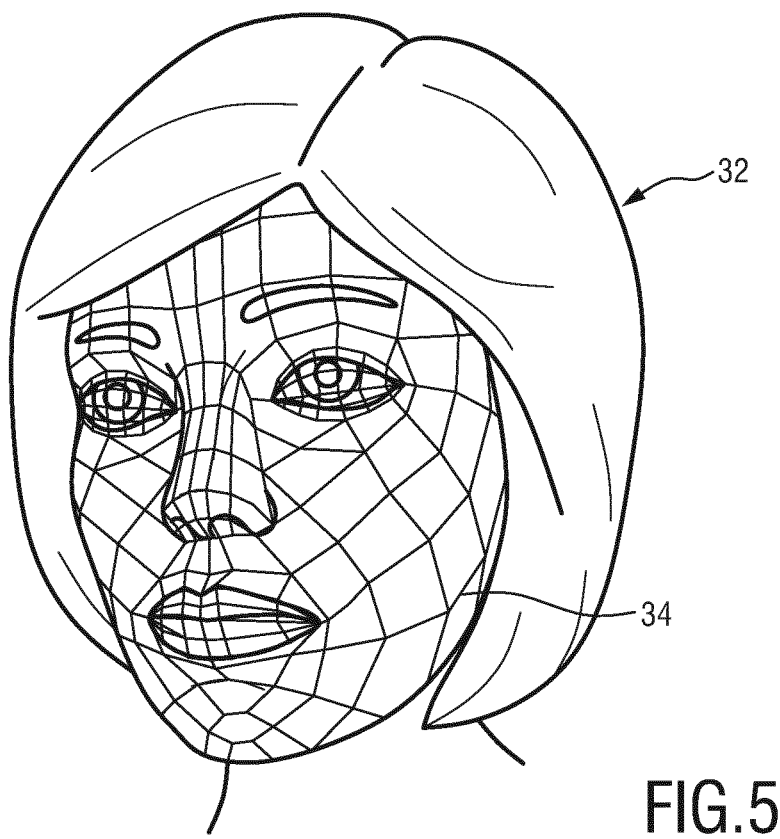
FIG. 5 shows an exemplary embodiment of a facial model that is herein denoted as "second model"

The final result of step S106 is the determination of the second model V of the test object which has an estimated scale. An example of such a model V is shown in FIG. 5 and indicated by reference numeral 34. It shall be noted that the second model V relates to the same test object, i.e. to the same face of the test person 32, that is shown in FIG. 4.

The size difference between FIG. 4 and FIG. 5 shall schematically indicate the rescaling from the first model L of the test object with unknown scale to the second model V of the test object with an estimated "true" scale.

It shall be also noted that the second model 34 is in FIG. 5 illustrated as a 3D mesh model. However, this is only one of a plurality of possible examples of such a second model V. Different types of embodiments are conceivable for the second model V: (i) in one embodiment the representation of V may be considered to be of equal type as the representation of the first model L; (ii) in another embodiment the representation of V can correspond to a detailed 3D model while the representation of L corresponds to a limited set of facial landmarks in 2D or 3D coordinates (embodiment illustrated in FIGS. 4 and 5). It shall be noted that when the representation of V is a detailed 3D model and the representation of L is a 2D landmark model, the proposed method results in a 2D to 3D conversion algorithm.

Figure 6A:
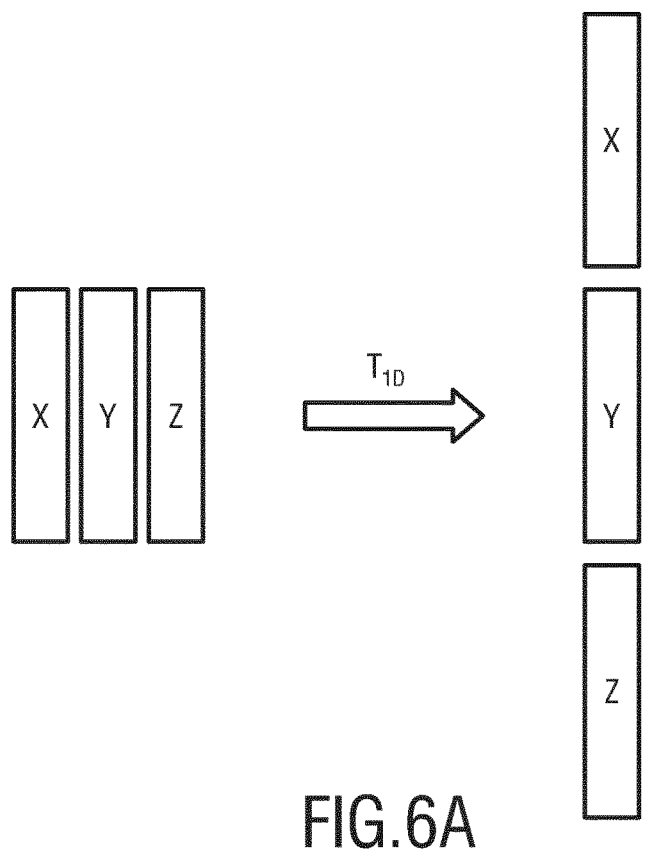
FIGS. 6A and 6B schematically illustrate a mathematical operation and its inverse operation.
Figure 6B:
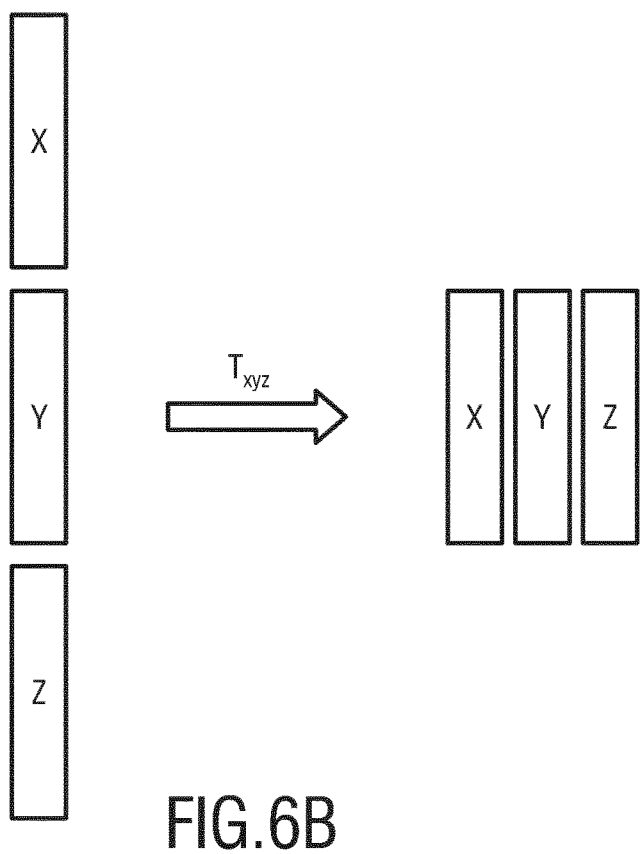

The above-mentioned formula for determining the second model of the test object V in step S106 is for mathematical reasons preferably reformulated as follows:

$$V = AvgV_{GT} + T_{xyz}(P^*T_{1D}(L_{GTS} - AvgL_{GT}))\qquad(1'')$$

wherein $T_{1D}$ is an operation which makes a single-column vector out of a 3-column (XYZ) matrix by stacking X, Y, Z coordinate columns on top of each other. This mathematical operation is schematically illustrated in FIG. 6A. $T_{xyz}$ is an inverse operation which splits a single column vector into X, Y, Z components and makes a 3-column matrix (XYZ) out of it. This inverse mathematical operation is schematically illustrated in FIG. 6B.

In the last step S107 of the herein presented method the size of the test object may be determined based on the estimated second model V of the test object. In other words, it is then e.g. possible to measure certain dimensions of a face of a test person even though originally only a regular (mono) photographic image of the test person was provided. This size determination may e.g. be used afterwards to select a patient interface for the test person that suits him/her best.

The following text passages include an explanation of how the statistical operator P and the second average model $AvgV_{GT}$ is determined. It shall be noted that optimally all these determinations are made beforehand before the image data of the test person are evaluated. The following determinations are thus preferably made during a learning phase of the device 10.

For every reference object G, i.e. selected sub-group of objects of the collection stored in the memory unit 16, the following actions are executed, respectively:

(1) A first model is received which is of a same type as the first model of the test object.

(2) A second model is received which is of the same type as the second model of the test object and has a known scale. Both the first models L as well as the second models V may be generated for each of the reference objects in the same manner as these models are generated for the test object. The difference is, however, that the real size dimensions of the reference objects are known.

(3) The first model L of each reference object G is aligned and scaled to the first average model $AvgL_{GT}$ by means of a best root mean square fit, such that it results in an aligned and scaled first model $L_{GTS}$ for each reference object separately. The alignment and scaling can be done again by using the weighted N-point alignment algorithm.

(4) The second model V of each reference object G is aligned to the second average model $AvgV_{GT}$. This alignment results in an aligned second model $V_{GT}$ for each reference object. A scaling is not necessary, since the second models V of the reference objects already have a common and known scale.

(5) An unscaled shape difference is then determined for each reference object, wherein said unscaled shape difference includes the shape difference of each of the reference objects to the average of the reference objects. This unscaled shape difference may be determined by calculating a difference between the aligned and scaled first model $L_{GTS}$ of each reference object and the first average model $AvgV_{GT}$. The difference vectors $L_{GTS}$ $AvgL_{GT}$ may be written as columns in a matrix $\mathcal{L}$.

(6) A scaled shape difference is determined for each reference object, wherein said scaled shape difference is determined by calculating a difference between the aligned second model $V_{GT}$ and the second average model $AvgV_{GT}$. The vectors $V_{GT}$ $AvgV_{GT}$ are also written as columns in a matrix $\mathcal{V}$.

(7) Finally, the statistical operator P may be determined as a common mathematical operator that transforms the determined unscaled shape differences written in matrix $\mathcal{L}$ to the determined scaled shape differences written in matrix $\mathcal{V}$. In other words, the statistical operator P is found by solving the following linear system:

$$\mathcal{V} = P \cdot \mathcal{L}.$$

Optionally (for example, when the number of reference objects G is less than the number of elements in the vector $L_{GTS}$) dimensionality reduction techniques (e.g. Principal Component Analysis) are applied to the aligned and scaled first model $L_{GTS}$ as a linear combination of the first average model $AvgL_{GT}$ and a limited number of the modal vectors $M_k$:

$$LGTS \approx AvgLGT + \text{sum}\_\{k=1, \ldots N\} Ck*Mk$$

where number of the modal vectors Mk is less or equal to the number of reference objects G.

The above approximation can be written in matrix form as: $\mathcal{L} \approx \mathcal{M} \cdot \mathcal{C}$ where the coefficients Ck corresponding the first models of the reference objects are written as the columns in matrix $\mathcal{C}$, and the elements of the modal vectors Mk are written as the columns in matrix $\mathcal{M}$.

The matrix $\mathcal{M}$, for example, can correspond to the first N eigenvectors of the covariance matrix:

The matrix of the coefficients $\mathcal{C}$ is found by solving of the over-defined linear system:

$$\mathcal{L} = \mathcal{M} \cdot \mathcal{C},$$

Thus, every LGTS can be represented with the vector of coefficients Ck, k=1, ... N.

Then the conversion matrix T is found by solving the well-/over-defined linear system $$\mathcal{V} = T \cdot \mathcal{C}$$

which allows the estimation:

$$VGT \approx AvgVGT + \text{sum}\_\{k=1, \ldots N\} Ck*Tk$$

where $T_k$ are the columns of the transformation matrix T and where the coefficients $C_k$ are found by solving the (over-defined) linear system $$LGTS - AvgL_{GT} = \text{sum}\_\{k=1, \ldots N\} Ck*Mk$$

In some embodiments matrix $\mathcal{C}$ can be represented as a linear combination of $\mathcal{L}$ $$\mathcal{C} = (\mathcal{M}^T \cdot \mathcal{M})^{-1} \cdot \mathcal{M}^T \cdot \mathcal{L}$$

which directly gives $$\mathcal{V} = P \cdot \mathcal{L}$$

with conversion matrix (statistical operator P)

$$P = T \cdot (\mathcal{M}^T \cdot \mathcal{M})^{-1} \cdot \mathcal{M}^T$$

With the determined statistical operator P the second model V may then be calculated in the way mentioned above (see formulas (1') or (1")).

Figure 7:
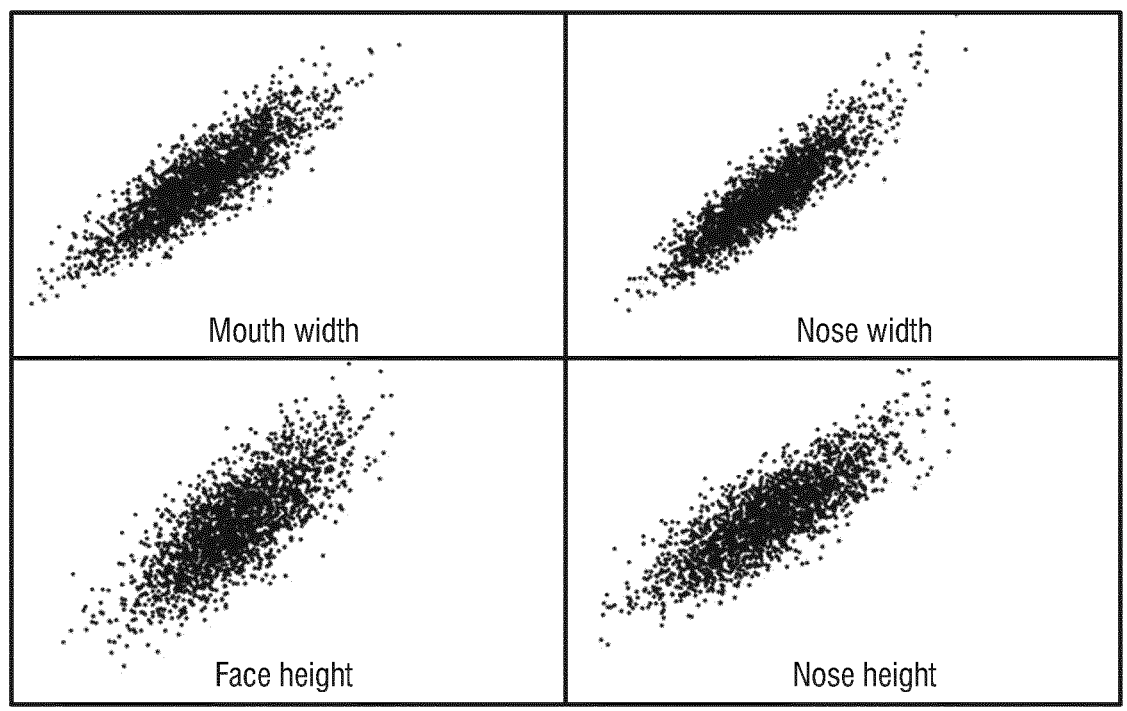
FIG. 7 illustrates four statistical plots for validating results of the method according to the present invention.

FIG. 7 shows an evaluation of several thousands of faces that have been analysed by means of the herein presented method. Each of the four plots visualized in FIG. 7 shows the relation between a facial dimension that has been calculated based on the herein presented method and the "real" facial dimension (ground truth). The facial dimensions under test were mouth width, nose width, face height, and nose height. As input model L for said validation of the method a scale-free 3D reconstruction of the complete face was used.

As it may be seen from all of these plots, a fairly good correlation between the estimated facial dimensions and the ground truth may be observed. The herein presented method may thus be seen as quite effective.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A method for estimating absolute size dimensions of a test object based on image data of the test object, the test object being a face or a part of a face of a test person, the method comprising the steps of:
   receiving image data of the test object;
   determining a first model of the test object based on the received image data, wherein the first model has an unknown scale;
   aligning and scaling the first model of the test object to a first average model, wherein the first average model includes an average of a plurality of first models of reference objects being faces or parts of faces of reference persons, wherein said first models of the reference objects are of a same type as the first model of the test object and have an unknown scale;
   determining a shape difference between the test object and an average of the reference objects by determining a difference between the aligned and scaled first model of the test object and the first average model;
   determining a second model of the test object with an estimated scale based on (i) the determined shape difference, (ii) a statistical operator that is indicative of a statistical correlation between shape and size dimensions of the reference objects, and (iii) a second average model, wherein the second average model includes an average of a plurality of second models of the reference objects, wherein said second models of the reference objects are of a same type as the second model of the test object and have a known scale; and
   determining the size dimensions of the test object based on the second model of the test object.

2. The method of claim 1, further including the step of determining the statistical operator, wherein said step includes:
   receiving for each of the reference objects a first model which is of a same type as the first model of the test object;

receiving for each of the reference objects a second model which is of a same type as the second model of the test object and has a known scale;

aligning and scaling the first model of each reference object to the first average model;

aligning the second model of each reference object to the second average model;

determining for each reference object an unscaled shape difference between each of the reference objects and the average of the reference objects by determining a difference between the aligned and scaled first model of each reference object and the first average model;

determining for each reference object a scaled shape difference between each of the reference objects and the average of the reference objects by determining a difference between the aligned second model of each reference object and the second average model; and determining a transformation from the determined unscaled shape differences to the determined scaled shape differences for all of the reference objects in a common mathematical operator which represents said statistical operator.

3. The method of claim 2, wherein the statistical operator is determined based on a least mean square method which minimizes a root mean square residual error between the scaled shape differences of all reference objects and a result of an application of the statistical operator applied to the determined unscaled shape differences of all reference objects.

4. The method of claim 1, wherein the second model of the test object is determined based on the following linear equation:

$$V = AvgV_{GT} + P^*(L_{GTS} - AvgL_{GT});$$

wherein V represents the second model of the test object, $AvgV_{GT}$ represents the second average model, P represents the statistical operator, $L_{GTS}$ represents the aligned and scaled first model of the test object, and $AvgL_{GT}$ represents the first average.

5. The method of claim 1, further comprising the step of selecting the plurality of first models of the reference objects from a collection of first models of objects of a same type as the test object, wherein the selected plurality of first models of the reference objects is a subset of said collection, and wherein the plurality of first models of the reference objects are selected based on:

(i) a comparison of the first model of the test object with the first models contained in said collection; and/or (ii) answers to a predefined questionnaire.

6. The method of claim 1, wherein scaling the first model of the test object to the first average model is based on a model fitting which includes a minimization of a root mean square of a difference between the first model of the test object and the first average model.

7. The method of claim 1, wherein the first model of the test object, the first models of the reference objects, the second model of the test object (32), and the second models of the reference objects include a collection of 2D landmarks, a collection of 3D landmarks, or a mesh of 2D landmarks or a mesh of 3D landmarks.

8. The method of claim 7, wherein the second model of the test object and the second models of the reference objects include a same amount of landmarks or more landmarks than the first model of the test object and the first models of the reference objects, respectively.

9. The method of claim 1, wherein the first model of the test object is determined by fitting a predetermined model template to the received image data.

10. The method of claim 1, wherein the first models of the reference objects are derived from a 2D image or a 2D image sequence.

11. The method of claim 1, wherein the second models of the reference objects are derived from 3D image data received from a 3D scanner, a MRI device, a CT device, an ultrasound device, or a x-ray device.

12. A method of selecting a patient interface that fits a test person, said patient interface is configured to provide a flow of breathable gas to an airway of the test person, wherein absolute size dimensions of a face of the test person are determined based on the method according to claim 1, wherein the test object is the face of the test person, wherein the reference objects are faces of reference persons, and wherein the patient interface is selected based on the determined size of the face of the test person.

13. A device for estimating absolute size dimensions of a test object based on image data of the test object, the test object being a face or a part of a face of a test person, the device comprising:

a receiving unit for receiving image data of the test object; and a processing unit which is configured to:

determine a first model of the test object based on the received image data, wherein the first model has an unknown scale;

align and scale the first model of the test object to a first average model, wherein the first average model includes an average of a plurality of first models of reference objects being faces or parts of faces of reference persons, wherein said first models of the reference objects are of a same type as the first model of the test object and have an unknown scale;

determine a shape difference between the test object and an average of the reference objects by determining a difference between the aligned and scaled first model of the test object and the first average model;

determine a second model of the test object with an estimated scale based on (i) the determined shape difference, (ii) a statistical operator that is indicative of a statistical correlation between shape and size dimensions of the reference objects, and (ii) a second average model, wherein the second average model includes an average of a plurality of second models of the reference objects, wherein said second models of the reference objects are of a same type as the second model of the test object and have a known scale; and determine the size dimensions of the test object based on the second model of the test object.

* * * * *